United States Patent
Khanka et al.

(10) Patent No.: US 8,223,711 B1
(45) Date of Patent: Jul. 17, 2012

(54) EFFICIENT MESSAGE DELIVERY TO WIRELESS COMMUNICATION DEVICES

(75) Inventors: Bhagwan Singh Khanka, Lenexa, KS (US); Sachin R. Vargantwar, Overland Park, KS (US); Manoj Shetty, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 436 days.

(21) Appl. No.: 12/606,537

(22) Filed: Oct. 27, 2009

(51) Int. Cl.
*H04W 4/00* (2009.01)
*H04B 1/00* (2006.01)
*H04Q 7/20* (2006.01)

(52) U.S. Cl. ........ 370/329; 370/331; 370/338; 370/486; 455/114.2; 455/127.1; 455/423; 455/452.2; 455/522

(58) Field of Classification Search .......... 370/252–486; 455/296, 114.2, 127.1, 406, 67.11, 436, 437, 455/438, 452.2, 522, 423; 379/114.09, 112.06, 379/114, 379/114.01
See application file for complete search history.

(56) References Cited

U.S. PATENT DOCUMENTS

| | | | |
|---|---|---|---|
| 7,016,678 B1 | 3/2006 | Kalliokulju et al. | |
| 8,130,793 B2 * | 3/2012 | Edwards et al. | 370/486 |
| 2007/0010253 A1 * | 1/2007 | Gunnarsson et al. | 455/442 |
| 2007/0243889 A1 | 10/2007 | Choi et al. | |
| 2009/0137221 A1 * | 5/2009 | Nanda et al. | 455/296 |
| 2009/0186626 A1 * | 7/2009 | Raghothaman | 455/452.2 |

\* cited by examiner

*Primary Examiner* — Afsar M. Qureshi

(57) ABSTRACT

What is discloses is a method of operating a wireless access node controller, where the wireless access node controller is supporting a first communication session with a wireless communication device. The method includes transferring communications of the first communication session for delivery to the wireless communication device over a plurality of forward links, and receiving a user content message of a second communication session for delivery to the wireless communication device. The method also includes determining a weakest of the plurality of forward links, and transferring the user content message for delivery to the wireless communication device over the weakest of the plurality of the forward links.

20 Claims, 6 Drawing Sheets

EFFICIENT MESSAGE DELIVERY TO WIRELESS COMMUNICATION DEVICES

TECHNICAL FIELD

Aspects of the disclosure are related to the field of communications, and in particular, message delivery to wireless communication devices in wireless communication networks.

TECHNICAL BACKGROUND

Wireless communication systems typically include wireless access nodes, such as base transceiver stations, which provide wireless access to wireless communication devices over wireless links. The access provided by the wireless access nodes are used to provide communication services of a wireless communication network to users of wireless communication devices. In many examples, the wireless access nodes exchange user communications and other signaling with the wireless communication network through a wireless access node controller.

Many times, the wireless communication devices are mobile communication devices which users move between the wireless coverage areas of the different wireless access nodes of the wireless communication system. When a wireless communication device moves between the wireless coverage areas of different wireless access nodes, a handoff process could be performed. This handoff process is employed to allow a wireless communication device presently communicating with one wireless access node to transition to another wireless access node. For example, during a soft handoff process of the code-division multiple access (CDMA) protocol, a list of active wireless access nodes is maintained through which a wireless communication device can receive communication service during a handoff. When a user initiates a voice call or other user communication through a wireless communication device, a wireless access node is selected to accommodate the user communications. However, when many wireless access nodes are available, it can be difficult to select between the wireless access nodes and to initiate multiple communication sessions.

Overview

What is disclosed is a method of operating a wireless access node controller, where the wireless access node controller is supporting a first communication session with a wireless communication device. The method includes transferring communications of the first communication session for delivery to the wireless communication device over a plurality of forward links, and receiving a user content message of a second communication session for delivery to the wireless communication device. The method also includes determining a weakest of the plurality of the forward links, and transferring the user content message for delivery to the wireless communication device over the weakest of the plurality of the forward links.

What is also disclosed is a wireless access node controller, where the wireless access node controller is supporting a first communication session with a wireless communication device. The wireless access node controller includes a communication interface configured to transfer communications of the first communication session for delivery to the wireless communication device over a plurality of forward links. The communication interface is also configured to receive a user content message of a second communication session for delivery to the wireless communication device. The wireless access node controller also includes a processing system configured to determine a weakest of the plurality of the forward links. The communication interface is also configured to transfer the user content message for delivery to the wireless communication device over the weakest of the plurality of the forward links.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
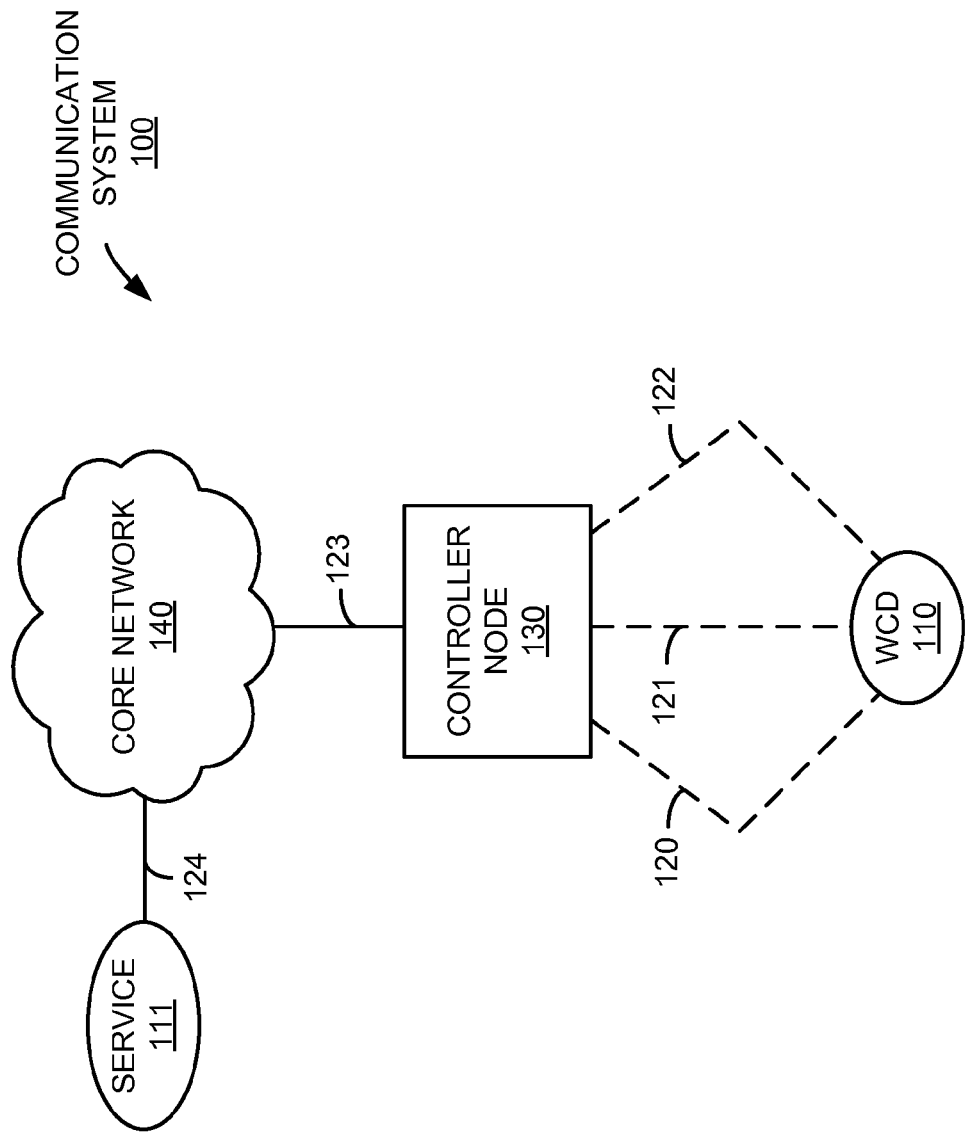
FIG. 1 is a system diagram illustrating a communication system.

FIG. 1 is a system diagram illustrating communication system 100. Communication system 100 includes wireless communication device (WCD) 110, wireless access node controller 130, core network 140, and service 111. Wireless communication device 110 and wireless access node controller 130 communicate over multiple links, links 120-122. Wireless access node controller 130 and core network 140 communicate over link 123. Core network 140 and service 111 communicate over link 124.

In FIG. 1, wireless communication device 110 is in a communication session with service 111 through wireless access node controller 130 and core network 140. The communication session could include a voice call, data session, or other communication session. Also, in FIG. 1, wireless communication device 110 can exchange communications of the communication session with service 111 over links 120-122. Links 120-122 could each include a forward link portion for transferring communications from wireless access node controller 130 to wireless communication device 110, and a reverse link portion for transferring communications from wireless communication device 110 to wireless access node controller 130, although other configurations could be employed. Links 120-122 could also each include wireless and wired portions.

Figure 2:
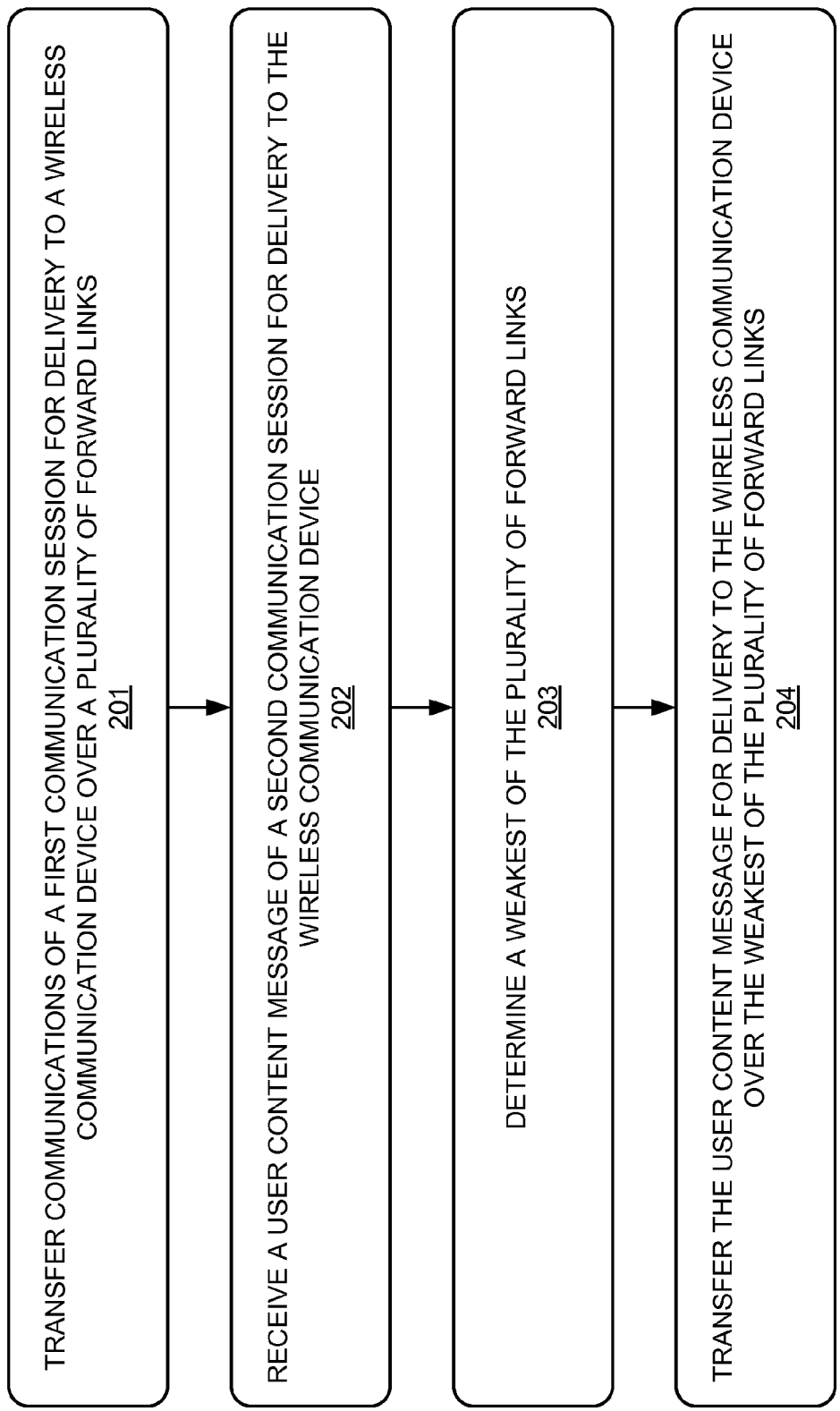
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless access node controller 130 transfers (201) communications of a first communication session for delivery to wireless communication device 110 over a plurality of forward links. In this example, the plurality of forward links include the forward link portions of links 120-122. Wireless access node controller 130 receives (402) a user content message of a second communication session for delivery to wireless communication device 110. Wireless access node controller 130 determines (403) a weakest of the plurality of forward links. In this example, a weakest of the forward link portions of links 120-122 is determined. The weakest of the forward link portions of links 120-122, in some examples, includes a link with the lowest radio frequency (RF) signal strength, a lowest signal-to-noise ratio, a highest error rate, or some other communication performance metric. Wireless access node controller 130 then transfers (404) the user content message for delivery to wireless communication device 110 over the weakest of the plurality of forward links.

Figure 3:
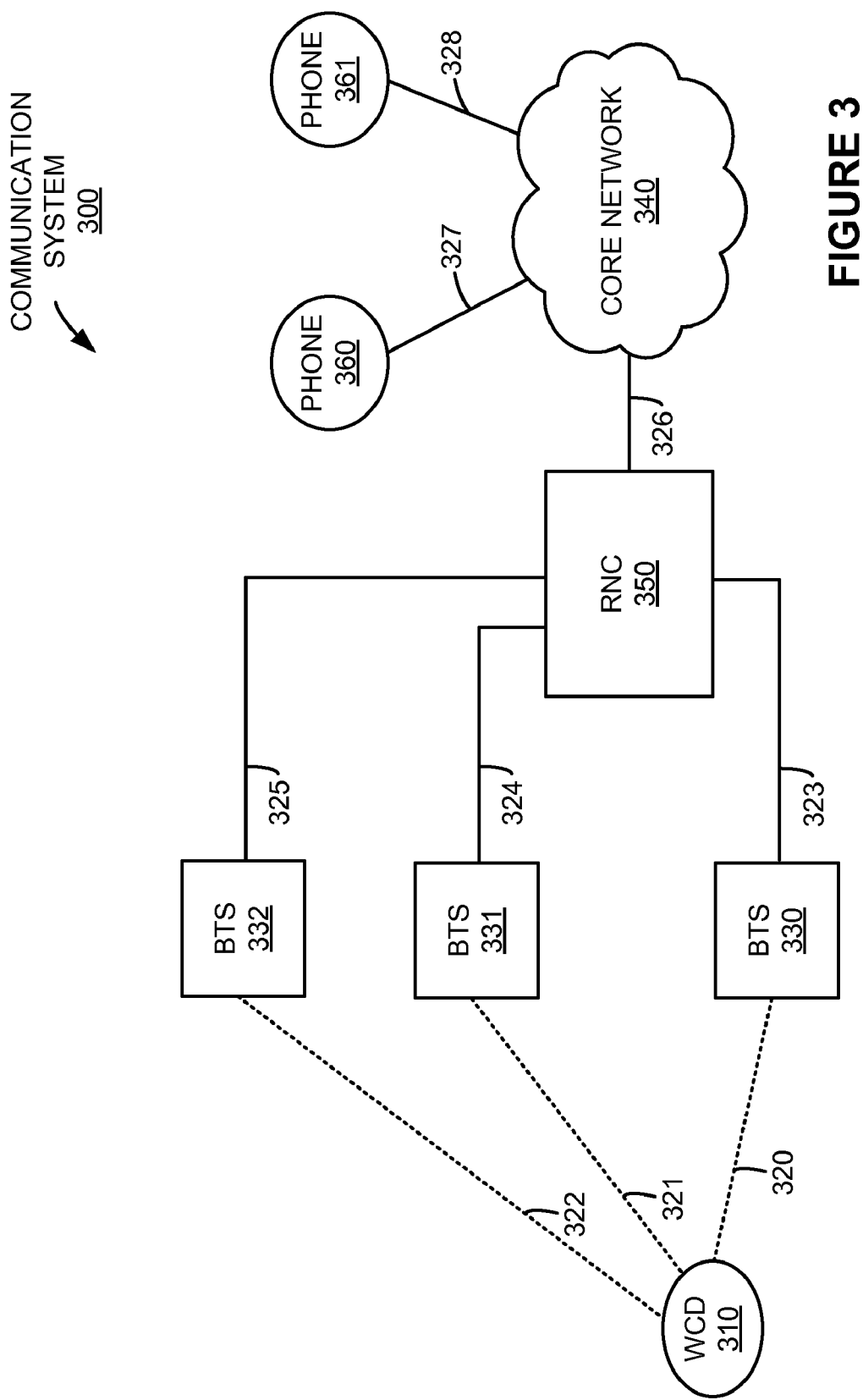
FIG. 3 is a system diagram illustrating a communication system.

FIG. 3 is a system diagram illustrating communication system 300. Communication system 300 includes wireless communication device (WCD) 310, base transceiver stations (BTS) 330-332, radio node controller (RNC) 350, core network 340, and phones 360-361. Wireless communication device 310 communicates with each of BTS 330-332 over wireless links 320-322, respectively. Each of BTS 330-332 communicate with RNC 350 over links 323-325, respectively. RNC 350 and core network 340 communicate over link 326. Phone 360 and core network 340 communicate over link 327. Phone 361 and core network 340 communicate over link 328.

In this example, links 323-325 are T1 links used as backhaul links between BTS 330-332 and RNC 350. Link 326 is an optical metropolitan area network (MAN) link between RNC 350 and core network 340. Links 327-328 are links between each of phones 360-361 and core network 340 which comprise wireless and wired portions. Although links 323-328 are each shown as a single link in FIG. 3, it should be understood that in other examples, additional links, equipment, or intermediary communication systems could be employed. Wireless links 320-322 employ the Code Division Multiple Access (CDMA) wireless protocol in this example. Links 323-325 and wireless links 320-322 each incorporate forward link and reverse link portions as described for links 120-122 in FIG. 1, although other configurations could be used.

Wireless communication device 310 and phones 360-361 each comprise wireless mobile phones in this example. Base transceiver station (BTS) 330-332 are wireless access nodes, and each could include communication equipment for a wireless access site, such as transceiver equipment, antennas, power sources, tower structures, among other equipment. Core network 340 is a core network of a wireless communications provider in this example. Core network 340 could include further sites, base stations, routers, gateways, controller systems, processing systems, carrier equipment, or other communication equipment. Radio node controller (RNC) 350 includes equipment to monitor and control the operations of BTS 330-332. RNC 350 also includes equipment to route communications between BTS 330-332 and core network 340, as well as equipment to control and coordinate handoffs of wireless communication device 310 between various wireless access nodes, such as BTS 330-332.

Figure 4:
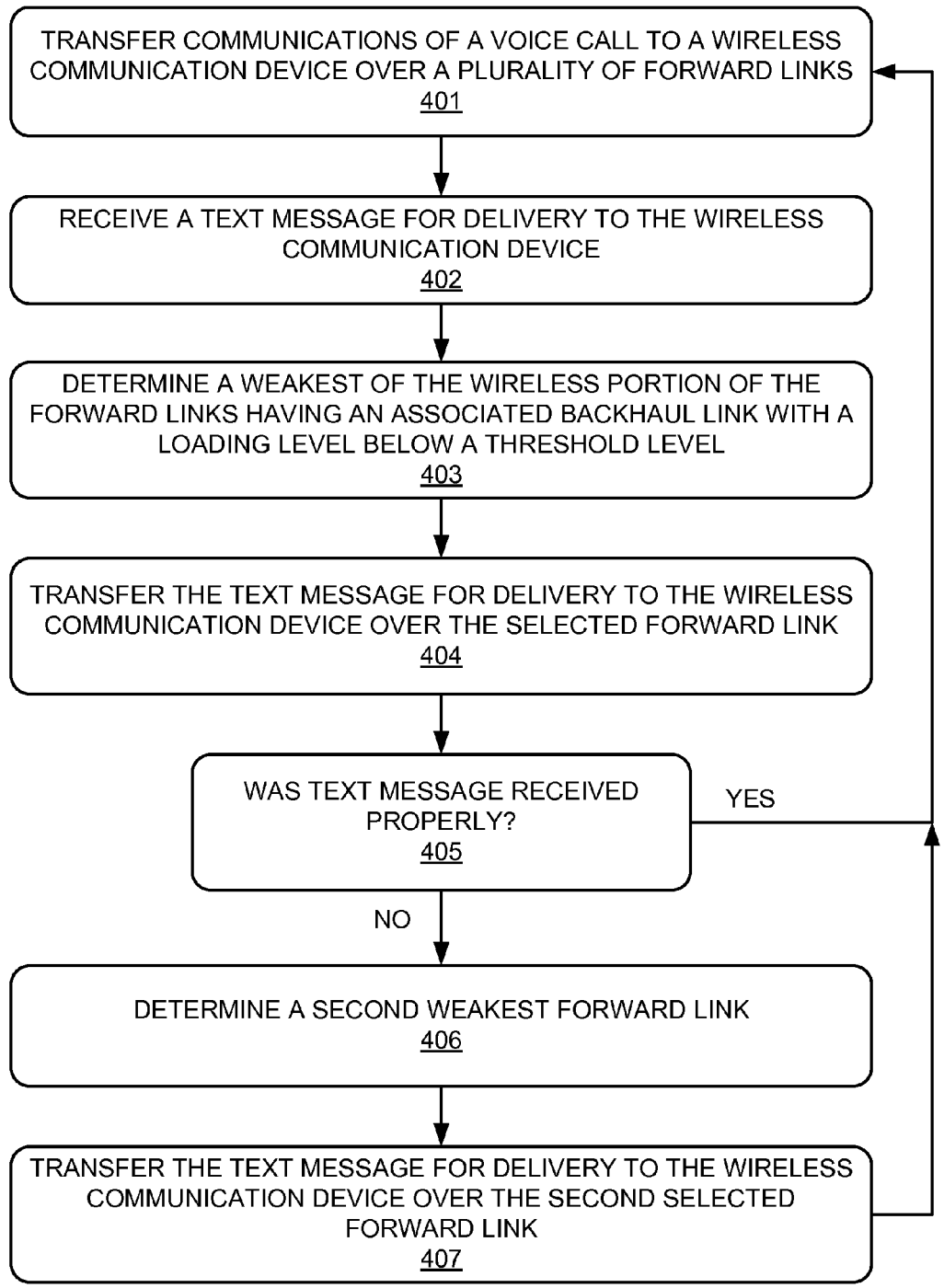
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, RNC 350 transfers (401) communications of a voice call to wireless communication device 310 over a plurality of forward links. In this example, the voice call is between wireless communication device 310 and phone 360. The communications of the voice call which are transferred to wireless communication device 310 are transferred over a forward link portion of links 323-325 and wireless links 320-322 simultaneously. In this example, this simultaneous communication comprises a soft handoff scenario between wireless communication device 310 and BTS 330-332.

In soft handoff, such as in the CDMA wireless protocol, a wireless communication device frequently makes radio frequency (RF) power measurements of overhead communications detected from a number of nearby wireless access nodes, such as base transceiver stations. The wireless communication device can request a wireless access node be added to an active list of wireless access nodes, through which the wireless communication device can then exchange user communications. Thus, in the example shown in FIG. 3, a soft handoff is active and includes BTS 330-332 in the active list of wireless access nodes. In some examples, the forward link portions of wireless links 320-322 use the same spreading code when BTS 330-332 are in soft handoff with wireless communication device 310. In other examples, the forward link portions of wireless links 320-322 use distinct associated spreading codes when BTS 330-332 are in soft handoff with wireless communication device 310. The spreading code could include a Walsh code or other spread spectrum spreading code.

During the voice call between wireless communication device 310 and phone 360, RNC 350 receives (402) a user content message for delivery to wireless communication device 310. In this example, the user content message is a text message received from phone 361 for delivery to wireless communication device 310, although other sources for a text message, or other user content message, could be described. User content messages can include text messages, short message service (SMS) messages, multimedia message service (MMS) messages, picture mail, e-mails, datagrams, network alerts, or other messages apart from the voice call of the existing communication session between wireless communication device 310 and phone 360. In some examples, phone 360 transfers a user content message to wireless communication device 310, in addition to the existing voice call, but in a separate communication session from the voice call.

RNC 350 determines (403) a weakest of the wireless portions of the forward links having an associated backhaul link with a loading level below a threshold level. In this manner, the weakest wireless link portion is determined while still having an associated backhaul link with a sufficiently low loading level. In this example, the wireless portions of the forward links include forward link portions of wireless links 320-322. Also, in this example, the associated backhaul links include links 323-325 which are correlated with the respective BTS for wireless links 320-322. A weakest of the wireless portions of the forward links could indicate a wireless forward link with the weakest radio frequency (RF) conditions, a weakest RF signal strength, a lowest a signal-to-noise ratio, a lowest channel signal-to-noise ratio, a particular current forward error correction code, a highest error rate, lowest bandwidth, lowest data rate, greatest distance, or other measures of communication link conditions or metrics. Other factors could include the BTS performance, or BTS wireless link channel or carrier loading. The loading level of the backhaul links could correspond to a traffic level, an available bandwidth, a number of utilized traffic channels, a packet loading level, a number of utilized traffic ports, a number of concurrent communication sessions, or other factors. The threshold level could indicate when the backhaul link has sufficient loading to transfer the communication session associated with the user content message, while still supporting the communications of other communications sessions handled by the associated BTS. In some examples, only the weakest of the wireless link portion is determined, while in other examples, only the backhaul link conditions are determined.

RNC 350 then transfers (404) the text message for delivery to wireless communication device 310 over the selected forward link. In some examples, transferring the text message, or other user content message, for delivery to wireless communication device 310 over the weakest of the plurality of the forward links includes transferring the text message for delivery to wireless communication device 310 over an overhead messaging portion of the weakest of the plurality of the forward links. In other examples, transferring the text message, or other user content message, for delivery to wireless communication device 310 over the weakest of the plurality of the forward links comprises transferring the user content message for delivery to wireless communication device 310 over a voice channel portion of the weakest of the plurality of the forward links.

If the text message is not properly received (405) by wireless communication device 310, the RNC 350 determines (406) a second weakest forward link. The second weakest forward link could include a wireless portion and a backhaul portion, as in operation 403, or could include other parameters. A second weakest wireless portion of the forward link typically includes the forward link with the next weakest RF conditions as compared to the wireless portion with the weakest RF conditions, although other factors, such as discussed above in operation 403, could be considered. Once the second weakest forward link portion is determined, then RNC 350 transfers (407) the text message for delivery to wireless communication device 310 over the selected forward link.

Advantageously, by determining the weakest link over which to transfer a user content message to a wireless communication device, a more efficient use of the links of communication system 300 can be provided. In a typical communication session, such as a voice call, multiple forward links can be used to transfer the communications of the communication session to a wireless communication device. However, when a second communication session is desired to be initiated with the same wireless communication device that is presently in a first communication session, the resources of the multiple forward links become compromised to accommodate the additional traffic load of the second communication session. The second communication session, such as a text message, is transferred over the weakest link. In some cases, the weakest link may be of such a low quality as to prevent a first delivery attempt of the message to the wireless communication device. However, the message can be retried over the same weakest link or over the next weakest link, and thus delivery can be assured for the second communication session while maintaining a high quality user experience for the first communication session. It should be noted that the advantages stated above may not apply equally to all embodiments discussed herein, and some embodiments may include different or additional advantages.

In further examples, multiple reverse links could be employed between a wireless communication device and multiple wireless access nodes or wireless access node controllers. If the wireless communication device desires to transfer a message, such as a text message, to another device or network element, the weakest reverse link could be selected and used. This can be advantageous when an existing communication session is active on the wireless communication device, such as a voice call, over a first reverse link. A second reverse link could be used to transfer a second communication session, such as the message, simultaneous to the voice call of the first communication session. In CDMA protocol examples with multiple reverse links, distinct spreading codes could be employed to achieve multiple reverse links with multiple base transceiver stations. Furthermore, reverse link portions of backhaul links between wireless access nodes and the associated wireless access node controller could be selected in a similar manner to the backhaul links as discussed herein for forward link portions.

Figure 5:
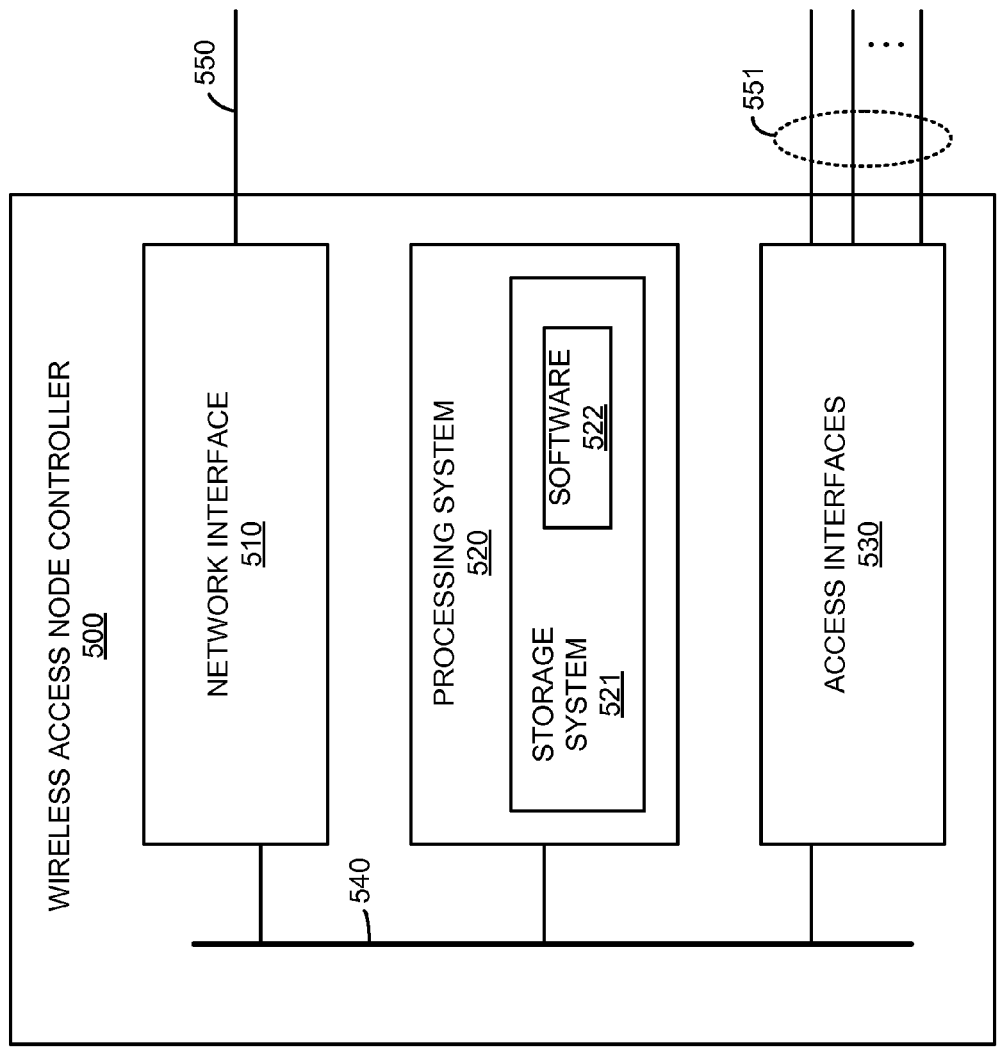
FIG. 5 is a block diagram illustrating a wireless access node controller.

FIG. 5 is a block diagram illustrating wireless access node controller 500, as an example of wireless access node controller 130 found in FIG. 1 or RNC 350 found in FIG. 3, although wireless access node controller 130 or RNC 350 could use other configurations. Wireless access node controller 500 includes network interface 510, processing system 520, and access interfaces 530. Network interface 510, processing system 520, and access interfaces 530 communicate over bus 540. Wireless access node controller 500 may be distributed among multiple devices that together form elements 510, 520-522, 530, 540, and 550-551.

Network interface 510 comprises network router and gateway equipment for communicating with a core network of a wireless communication provider, such as core network 140 or core network 340. Network interface 510 exchanges user communications and overhead communications with a core network of a wireless communication system, omitted for clarity, over link 550. Link 550 could use various protocols or communication formats as described herein for links 123 or 326, including combinations, variations, or improvements thereof.

Processing system 520 includes storage system 521. Processing system 520 retrieves and executes software 522 from storage system 521. In some examples, processing system 520 is located within the same equipment in which network interface 510 or access interfaces 530 are located. Storage system 521 could include a computer-readable medium such as a disk, tape, integrated circuit, server, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs processing system 520 to operate as described herein.

Access interfaces 530 comprises multiple communication interfaces, each for communicating with a wireless access node, such as base transceiver stations. Access interfaces 530 could include network router and gateway equipment for exchanging user communications and overhead communications with wireless access nodes of a wireless communication system, omitted for clarity, over links 551. Access interfaces 530 also receive command and control information from processing system 520 for controlling the operations of wireless access nodes over links 551, as well as for coordinating handoffs of wireless communication devices between various wireless access nodes. Links 551 could each use various protocols or communication formats as described herein for links 120-122 or 323-325, including combinations, variations, or improvements thereof.

Bus 540 comprises a physical, logical, or virtual communication link, capable of communicating data, control signals, and communications, along with other information. In some examples, bus 540 is encapsulated within the elements of network interface 510, processing system 520, or access interfaces 530, and may be a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

Figure 6:
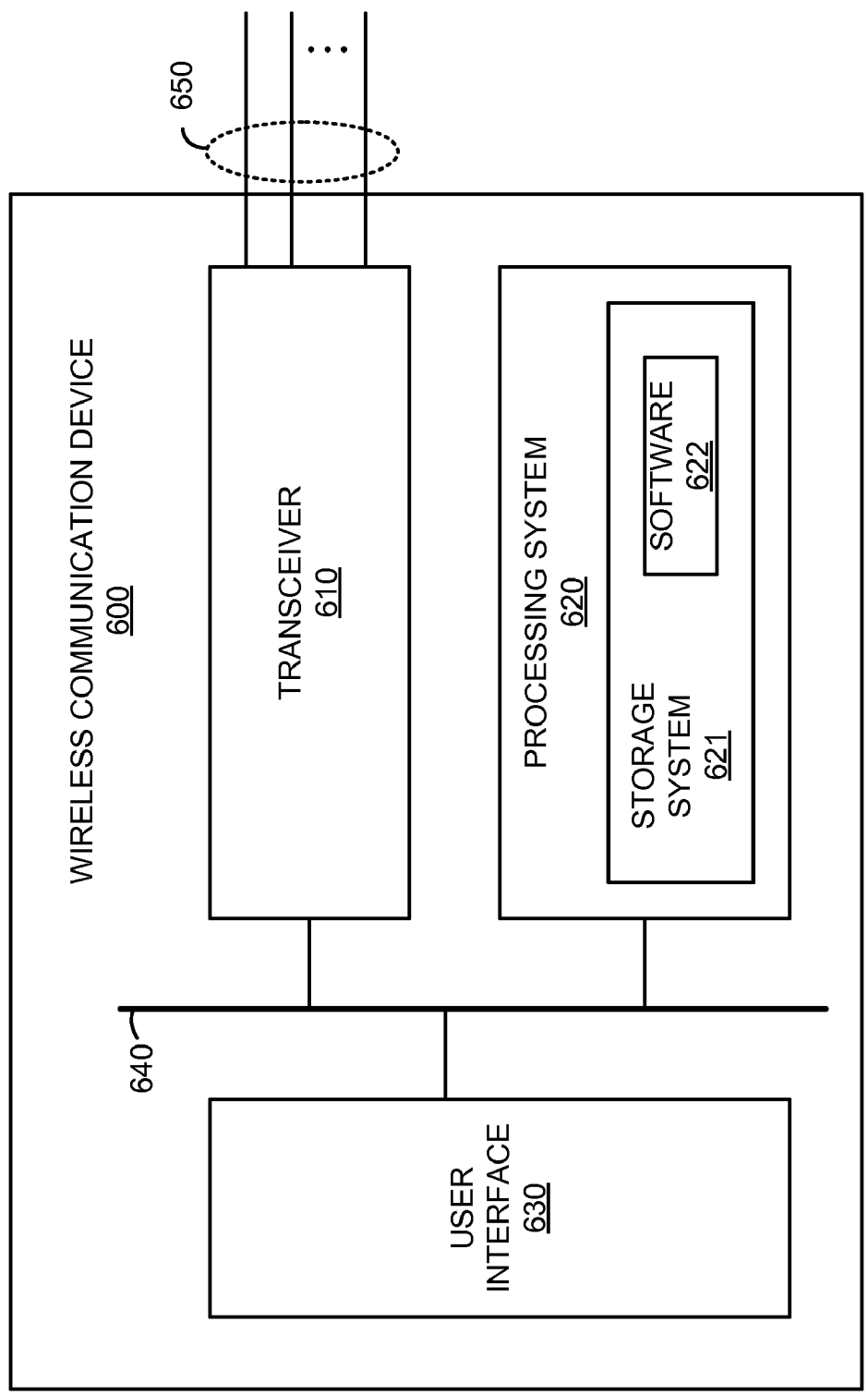
FIG. 6 is a block diagram illustrating a wireless communication device.

FIG. 6 is a block diagram illustrating wireless communication device 600, as an example of wireless communication device 110 found in FIG. 1 or wireless communication device 310 in FIG. 3, although wireless communication devices 110 and 310 could use other configurations. Wireless communication device 600 includes transceiver 610, processing system 620, and user interface 630. Transceiver 610, processing system 620, and user interface 630 communicate over bus 640. Wireless communication device 600 may be distributed or consolidated among devices that together form elements 610, 620-622, 630, 640, and 650.

Transceiver 610 comprises radio frequency (RF) communication circuitry and antenna elements. Transceiver 610 could also include amplifiers, filters, modulators, and signal processing circuitry. In this example, transceiver 610 can exchange instructions and information with processing system 620. Transceiver 610 also communicates with multiple wireless access nodes, such as base transceiver stations, omitted for clarity, over wireless links 650. Wireless links 660 could use various protocols or communication formats as described herein for wireless links 120-122 or wireless links 320-322, including combinations, variations, or improvements thereof.

Processing system 620 includes storage system 621. Processing system 620 retrieves and executes software 622 from storage system 621. Processing system 620 could incorporate a computer microprocessor, logic circuit, or some other processing device, and may be distributed among multiple processing devices. Processing system 620 or user interface 630 could be located within the same equipment or circuitry in which transceiver 610 is located. Storage system 621 could include computer-readable media such as disks, tapes, integrated circuits, servers, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs wireless communication device 600 to operate as described herein.

User interface 630 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 630 also includes equipment to communicate information to a user of wireless communication device 600. Examples of the equipment to communicate information to the user could include indicator lights, lamps, light-emitting diodes, displays, haptic feedback devices, audible signal transducers, speakers, buzzers, alarms, vibration devices, or other indicator equipment, including combinations thereof.

Bus 640 comprises a physical, logical, or virtual communication link, capable of communicating data, control signals, communications, and power, along with other information and signals. In some examples, bus 640 is encapsulated within the elements of transceiver 610, processing system 620, or user interface 630, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Referring back to FIG. 1, wireless communication device 110 comprises radio frequency (RF) communication circuitry and antenna elements. The RF communication circuitry typically includes amplifiers, filters, modulators, and signal processing circuitry. In many examples, wireless communication device 110 includes circuitry and equipment to receive wireless communication services over multiple wireless links, such as wireless links 120-122. Wireless communication device 110 may also include user interface systems, memory devices, computer-readable storage mediums, software, processing circuitry, or some other communication components. Wireless communication device 110 may be a telephone, mobile wireless telephone, computer, e-book, mobile Internet appliance, wireless network interface card, media player, game console, or some other wireless communication apparatus, including combinations thereof.

Service 111 may be an application server, emergency service provider, voice service, data service, or other communication service. Service 111 could also include a telephone, mobile wireless telephone, computer, e-book, mobile Internet appliance, wireless network interface card, media player, game console, or some other communication apparatus, including combinations thereof. In some examples, service 111 includes a telephone on the public switched telephone network (PSTN), and could reside on a local circuit of the PSTN, such as a home, business, or other location.

Wireless access node controller 130 comprises RF communication and control circuitry and antenna elements. The RF communication circuitry typically includes amplifiers, filters, RF modulators, and signal processing circuitry. In many examples, wireless access node controller 130 includes equipment to provide wireless communication services to wireless communication device 110, and route communications between core network 140 and wireless communication device 110. Wireless access node controller 130 may also comprise a router, server, memory device, software, processing circuitry, cabling, power supply, network communication interface, physical structural support, or some other communication apparatus. Wireless access node controller 130 could include a base station, base transceiver station, base station controllers (BSC), mobile switching centers (MSC), radio node controllers (RNC), call processing systems, authentication, authorization and accounting (AAA) equipment, access service network gateways (ASN-GW), Internet access node, telephony service node, wireless data access point, or some other wireless communication system, including combinations thereof. Wireless access node controller 130 typically includes equipment to monitor and control the operations of wireless access nodes and wireless communication devices, including coordinating handoffs of wireless communication devices.

Core network 140 comprises the core network of a wireless communications provider, and could include routers, gateways, telecommunication switches, processing systems, or other communications equipment and systems for providing communication and data services. In the example shown in FIG. 1, core network 140 routes communications between service 111 and wireless communication device 110 through wireless access node controller 130. Core network 140 may also comprise optical networks, asynchronous transfer mode (ATM) networks, packet networks, metropolitan-area networks (MAN), or other network topologies, equipment, or systems, including combinations thereof. In some examples, core network 140 includes further wireless access node controllers and associated equipment for providing communication services to many wireless communication devices across a geographic region.

Wireless links 120-122 each use the air or space as the transport media. Wireless links 120-122 may each use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication links 123-124 each use metal, glass, optical, air, space, or some other material as the transport media. Communication links 123-124 could each use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof. In some examples, communication link 124 includes a circuit-switched voice link between core network 140 and service 111.

Links 120-124 may each include many different signals sharing the same link—as represented by the associated lines in FIG. 1—comprising access channels, forward links, reverse links, user communications, communication sessions, overhead communications, frequencies, channels, carriers, timeslots, transportation ports, logical transportation links, network sockets, packets, or communication directions. Communication links 120-124 could each be direct links or may include intermediate networks, systems, or devices. In many examples, the portion of wireless links 120-122 as transmitted by wireless communication device 110 is referred to an uplink or reverse link of the wireless link, while the portion as transmitted by wireless access node controller 130 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access node controller, wherein the wireless access node controller is supporting a first communication session with a wireless communication device, the method comprising:
   transferring communications of the first communication session for delivery to the wireless communication device over a plurality of forward links;
   receiving a user content message of a second communication session for delivery to the wireless communication device;
   determining a weakest of the plurality of the forward links; and
   transferring the user content message for delivery to the wireless communication device over the weakest of the plurality of the forward links.

2. The method of claim 1, wherein the each of the plurality of forward links comprises:
   a backhaul link between the wireless access node controller and an individual one of a plurality of wireless access nodes; and
   a wireless link between the associated individual one of the plurality of wireless access nodes and the wireless communication device.

3. The method of claim 2, wherein each of the wireless links comprises a code division multiple access (CDMA) forward link, and wherein each CDMA forward link has a distinct associated spreading code.

4. The method of claim 2, wherein determining the weakest of the plurality of the forward links comprises determining a one of the wireless links with the weakest radio frequency (RF) conditions.

5. The method of claim 2, wherein determining the weakest of the plurality of the forward links comprises determining a one of the wireless links with the weakest radio frequency (RF) conditions having an associated backhaul link with a loading level below a threshold level.

6. The method of claim 1, further comprising:
   determining if the user content message was successfully delivered over the weakest of the plurality of the forward links;
   if the user content message was not successfully delivered, then determining a second weakest of the plurality of the forward links; and
   transferring the user content message for delivery to the wireless communication device over the second weakest of the plurality of the forward links.

7. The method of claim 1, wherein transferring the user content message for delivery to the wireless communication device over the weakest of the plurality of the forward links comprises transferring the user content message for delivery to the wireless communication device over an overhead messaging portion of the weakest of the plurality of the forward links.

8. The method of claim 1, wherein transferring the user content message for delivery to the wireless communication device over the weakest of the plurality of the forward links comprises transferring the user content message for delivery to the wireless communication device over a voice channel portion of the weakest of the plurality of the forward links.

9. The method of claim 1, wherein the wireless communication device is in soft handoff with a plurality of wireless access nodes over the plurality of forward links.

10. The method of claim 1, wherein the user content message comprises a text message.

11. A wireless access node controller, wherein the wireless access node controller is supporting a first communication session with a wireless communication device, comprising:
   a communication interface configured to transfer communications of the first communication session for delivery to the wireless communication device over a plurality of forward links;
   the communication interface configured to receive a user content message of a second communication session for delivery to the wireless communication device;
   a processing system configured to determine a weakest of the plurality of the forward links; and
   the communication interface configured to transfer the user content message for delivery to the wireless communication device over the weakest of the plurality of the forward links.

12. The wireless access node controller of claim 11, wherein the each of the plurality of forward links comprises:
   a backhaul link between the wireless access node controller and an individual one of a plurality of wireless access nodes; and
   a wireless link between the associated individual one of the plurality of wireless access nodes and the wireless communication device.

13. The wireless access node controller of claim 12, wherein each of the wireless links comprises a code division multiple access (CDMA) forward link, and wherein each CDMA forward link has a distinct associated spreading code.

14. The wireless access node controller of claim 12, wherein the processing system is configured determine a one of the wireless links with the weakest radio frequency (RF) conditions to determine the weakest of the plurality of the forward links.

15. The wireless access node controller of claim 12, wherein the processing system is configured to determine a one of the wireless links with the weakest radio frequency (RF) conditions having an associated backhaul link with a loading level below a threshold level to determine the weakest of the plurality of the forward links.

16. The wireless access node controller of claim 11, comprising:
   the processing system configured to determine if the user content message was successfully delivered over the weakest of the plurality of the forward links;
   if the user content message was not successfully delivered, then the processing system configured to determine a second weakest of the plurality of the forward links; and
   the communication interface configured to transfer the user content message for delivery to the wireless communication device over the second weakest of the plurality of the forward links.

17. The wireless access node controller of claim 11, wherein the communication interface is configured to transfer the user content message for delivery to the wireless communication device over an overhead messaging portion of the weakest of the plurality of the forward links.

18. The wireless access node controller of claim 11, wherein the communication interface is configured to transfer the user content message for delivery to the wireless communication device over a voice channel portion of the weakest of the plurality of the forward links.

19. The wireless access node controller of claim 11, wherein the wireless communication device is in soft handoff with a plurality of wireless access nodes over the plurality of forward links.

20. The wireless access node controller of claim 11, wherein the user content message comprises a text message.

* * * * *